United States Patent [19]
Ellis

[11] Patent Number: 5,299,472
[45] Date of Patent: Apr. 5, 1994

[54] SAW BLADE TIPPING APPARATUS

[75] Inventor: Glynn A. Ellis, Long Eaton, United Kingdom

[73] Assignee: Razedge Limited, United Kingdom

[21] Appl. No.: 765,534

[22] Filed: Sep. 25, 1991

[30] Foreign Application Priority Data

Sep. 25, 1990 [GB] United Kingdom ............... 9020788

[51] Int. Cl.$^5$ ............................................. B32D 65/00
[52] U.S. Cl. ..................................... 76/112; 76/25.1; 76/DIG. 11; 228/5.1; 228/6.1
[58] Field of Search ................ 76/25.1, 112, 75, 80, 76/DIG. 11, DIG. 12; 228/47, 5.1, 6.1, 33

[56] References Cited

U.S. PATENT DOCUMENTS

| 3,960,310 | 6/1976 | Nussbaum | 76/25.1 |
| 3,982,047 | 9/1976 | Braden | 228/47 |
| 4,564,136 | 1/1986 | Kahny | 76/112 |
| 4,864,896 | 9/1989 | Pfaltzgraff | 76/25.1 |

Primary Examiner—Roscoe V. Parker
Attorney, Agent, or Firm—Locke Reynolds

[57] ABSTRACT

A method of and apparatus for mounting hard material tips to a cutter tool such as a saw blade body (6), wherein a gripper/pick-up member/element (4) for handling the tips (8) to be mounted or other material required in the tip mounting operation is moveable about an axis (1) in order to transfer the tips or other material from a supply(ies) thereof to a location (9) at which the tips can be mounted or said other material can be utilized in the mounting of the tips.

5 Claims, 5 Drawing Sheets

SAW BLADE TIPPING APPARATUS

This invention is concerned with apparatus for manufacturing saw blades having teeth each provided with a hard material cutting tip. In particular, the present invention is concerned with methods and apparatus for the mounting of the hard material tips to the teeth of such saw blades.

It is a well known practice, to form saw blades having a large number of teeth each provided with a hard material tip. The present day requirements of industry and commerce are such that a wide variety of types of blades are necessary in order to be able to satisfy the wide range of user requirements and to be able to cut efficiently the wide range of materials now available for the manufacture of articles, such materials including ferrous metals, non-ferrous metals, wood, plastics, and composites of such materials. In addition, it is a common practice to provide the blades with different tip profiles whereby successive tips effect different cutting actions.

The production of such tipped blades involves many production stages and for the purpose of the present specification only those stages of the manufacturing process relevent to the present invention will be discussed. Similar considerations will apply to the associated apparatus.

Thus, it will be assumed for the purposes of the following description that a saw blade has been produced to the stage that it has formed therein a central mounting bore, the specified number of teeth and their associated location recesses for receiving the associated hard material tips.

As mentioned the tips can take various forms. The tips are also formed from a variety of materials, one such material being tungsten carbide. Generally, tips are of a rectangular block like form of relatively small size, for example, 5 millimeters in length, three millimetres wide and two millimetres deep.

The tips are frequently initially preshaped so as to provide a region that is intended to seat into the tip locating recess provided in the saw blade tooth and so as generally to conform to the profile required for providing an effective cutting edge.

During the tip mounting process each tip needs to be correctly oriented with respect to the associated blade tooth recess and brazed or otherwise securely attached to the blade tooth. In the production of a tipped blade it is of very great importance that every tip is mounted as close as possible into the defined setting with respect to the blade body. The positional tolerances for this defined setting are very small and are measured in thousandths of an inch.

In practice, such accurate positioning of the tips is of vital importance since after the tips have been mounted it is necessary to grind the front face, the top face, and the side faces of the tips in order that these various faces are set at extremely precise angles with respect to each other. This is necessary because the cutting efficiency and the working life of the blade are very closely related to the angular relationships between the various tip faces.

Since for many types of saw blade there is a large number of teeth to each blade, for example, from twenty to more than one hundred, the mounting of the tips is a time consuming high precision industrial process.

To reduce as far as possible the time required for mounting tips to a blade body, apparatus has been proposed in which the blade body can be stepwise indexed about a horizontal axis so that each tooth is processed through a brazing or welding station at which a tooth and tip can be heated to a requisite brazing temperature. Such apparatus is provided with gripper/pick-up arrangements for gathering the tips from a supply thereof and for presenting them to the brazing station.

In the known apparatus one or more tip supply or feeder units are located at predetermined locations relative to the brazing station. Each tip feeder unit is required to feed a tip from a supply thereof in such manner that each tip is automatically set to a predetermined orientation position and at a location at which a tip gripper/pick-up unit is able to engage with the tip presented thereto and transfer the tip in its correct orientation to the brazing station. In the known apparatus the tip feeding arrangements conventionally incorporate vibratory bowl feeder units which in operation deliver from a bulk supply of tips in the base of the bowl a train of the tips along a usually spiral feed path. Means are conventionally provided in the path for setting the tips into a predetermined orientation during their travel towards a delivery position outside the bowl, which position is arranged to feed the into the inlet end of a gravity feed or vibratory linear guide chute or other tip further feed path arrangement whose outlet delivers the tips to a pick-up location. With the known apparatus, in the event of a blockage in the tip feed path, tips are frequently discharged from the system and become lost or damaged. Furthermore, such discharged tips frequently fall into other parts of the apparatus and thereby result in a breakdown of the apparatus which can often be very time consuming to rectify. In is an object of one aspect of the invention to avoid these problems.

The known apparatus may also be provided with separate gripper/pick-up units for transferring brazing material from a supply thereof to the brazing station; for applying brazing flux to the brazing location. Both of these materials need to be applied to the tooth at the correct stage of the tip mounting sequence. It is also known to precoat either or both the blade or the tip with braze material.

With these known machines the various gripper/pick-up units are separately operable. The individual and collective operation thereof being under the control of a highly complex control and sequencing system to ensure the requisite sequences of operation. It will be appreciated that as each unit has to undergo its particular operational cycle the time required for the operation of all of the units involved can be considerable. In the mass production of tipped saw blades such excessive time demand is regarded as being unacceptable. A further important factor is that since a number of separate units are involved together with the highly complex sequencing system the resulting apparatus becomes very costly.

In general the tip mounting operation involves for tips or teeth already provided with brazing material a sequence of steps as follows: rotating the blade to index the next tooth to receive a tip to the tip mounting position of the apparatus, locking the blade against further movement, operating the tip pick-up arrangements to pick-up a tip from a supply, transfering the tip from the pick-up arrangement to a tip support member, moving the tip support member so that the tip is advanced towards the mounting position, heating the tip and tooth to enable the brazing operation, sliding the tip whilst the braze material is molten to its desired position, holding the tip in the desired position until the braze material has hardened, retracting the tip support member to its tip receiving position, releasing the blade, rotating the blade to index the next tooth to be provided with a tip to the brazing station. In practice, the displacement of the tip whilst the braze is molten has been found to lead to unsatisfactory mounting of the tips. It is an object of the invention to avoid such tip movement.

It will be appreciated that the correct amount of weld or braze material has to be provided between the tip and tooth surfaces that are to be welded or brazed one to the other. In practice it is of great importance to ensure that during the welding or brazing operation the requisite amount of welding or brazing material is maintained between the surfaces, whilst ensuring that the tip is brought to the correct positional setting with respect to the blade tooth to ensure that the cutting edges of the tips will all lie in the requisite operational settings after the tip has been mounted.

In the known apparatus a tip support device into which a tooth is delivered by means of the pick-up unit such that the tip is correctly oriented so that when it is presented towards the tooth the tip is in its correct orientation for the welding or brazing of the tip to the tooth recess.

In general, the known apparatus includes a heat resistant support upon which the tip is placed by the pick-up unit. Arrangements are provided for presenting the tip supported thereby to the tip receiving recess having a main surface which is to co-operate with the bottom of the tip and an end surface that is to co-operate with the inner end of the tip in a two stage operation. The first stage involves bodily lifting the tip into engagement with the main surface. The heating apparatus is operated to melt the braze material and heat the faces to be joined. After which the support member is caused to slide the tip lengthwise of the main surface so as to ensure that the end surface of the tip is sufficiently nested into the recess. In practice, this mode of handling the tip inherently involves wiping the heated braze material lengthwise of the main surface and in so doing removing variable amounts of braze from between the facing surfaces thereby resulting in a variable quality of brazing of the tip to the tooth recess.

With the known apparatus the pick-up and feeder arrangements are required to effect a plurality of alternate advancing and retracting movements. In practice, the need for the pick-up and/or gripper devices having to carry out such a large number of reciprocating type movements involves a considerable amount of time and the possibility of inaccuracies being introduced into the placement of the various materials involved.

As an object of the invention it is proposed to eliminate this need for effecting the relative sliding movement whilst the braze is in the molten state.

Further apparatus has proposed linear movements for the pick-up/gripper devices so that the latter are linearly reciprocated between locations or supplies of the brazing material, flux and tips and the brazing station. It will be appreciated that the reciprocating movements introduce various time delays which can impede high speeds of production operation.

According to a first aspect of the invention there is provided a method of mounting hard material tips to a saw blade body, in which a gripper/pick-up element for handling the tips to be mounted or other material required in the tip mounting operations is rotatable about an axis in order to transfer the tips or other material from a supply(ies) thereof to a location at which the tips can be mounted or said other material can be utilised in the mounting of the tips.

Conveniently, the gripper/pick-up element is rotatable relative to a work station such as a brazing station and at least one supply location for tips and/or relative to locations for brazing material, flux material; is caused to engage with a selected tip or material; and then undergoes a rotational movement to deliver the tip or material to the work station.

According to a second aspect of the invention there is provided apparatus for mounting hard material tips to a saw blade body, wherein a gripper/pick-up element is mounted so as to be rotatable about an axis so as to be operationally displacable between a work station such as a brazing station and at least one supply location for tips and/or relative to supply locations for brazing material, flux material.

In accordance with a further aspect of the invention the tip is advanced towards the tooth to which it is to be mounted in such manner that the tip may be secured to the tooth without any relative sliding displacement between the tip and tooth whilst the weld material is in a molten condition.

In a preferred arrangement the gripper-pick-up element is arranged for rotation around a fully circular path about a vertical axis.

In a further arrangement the gripper/pick-up element is oscillated about a vertical axis between the work station and one or more of said locations as required.

According to a further aspect of the invention the tips are supplied to a tip pick-up/transfer location by a vibratory bowl feeder, wherein the pick-up/transfer location is located internally of the bowl of the vibratory feeder.

For better understanding of the invention and to show how to carry the same into effect reference will now be made to the accompanying drawings in which.

Figure 1:
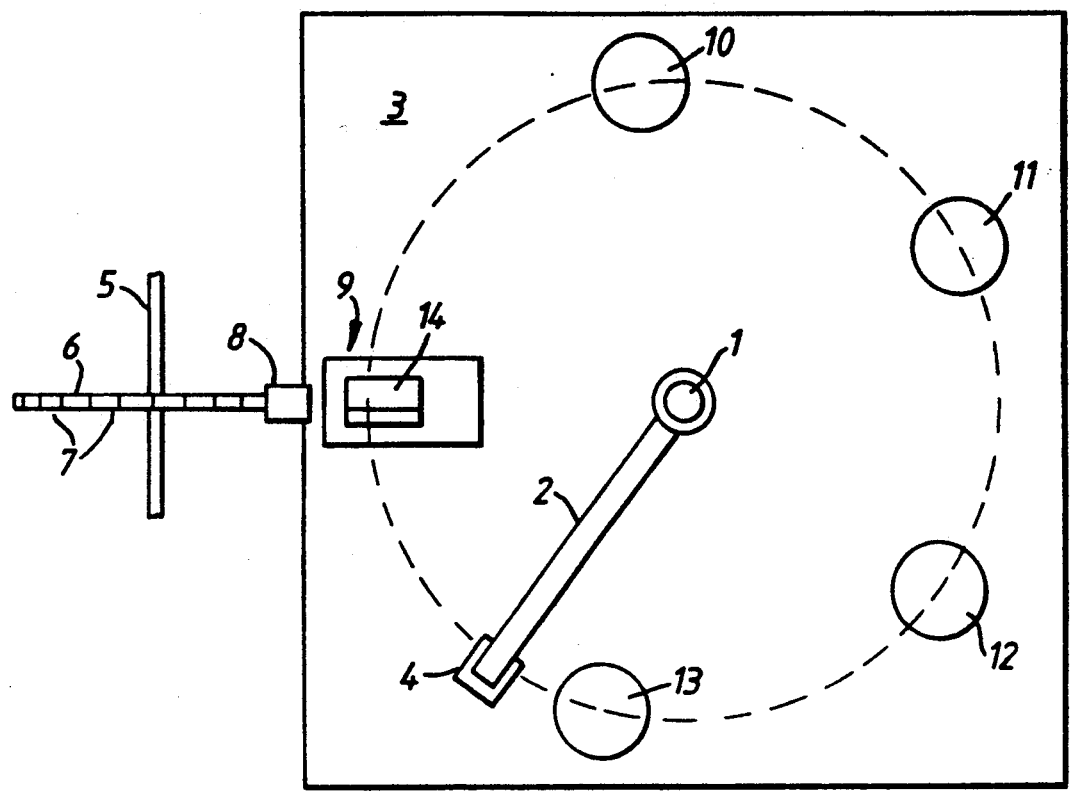
FIG. 1 is a very schematic plan view illustrating the principles of the apparatus of the invention.
Figure 2:
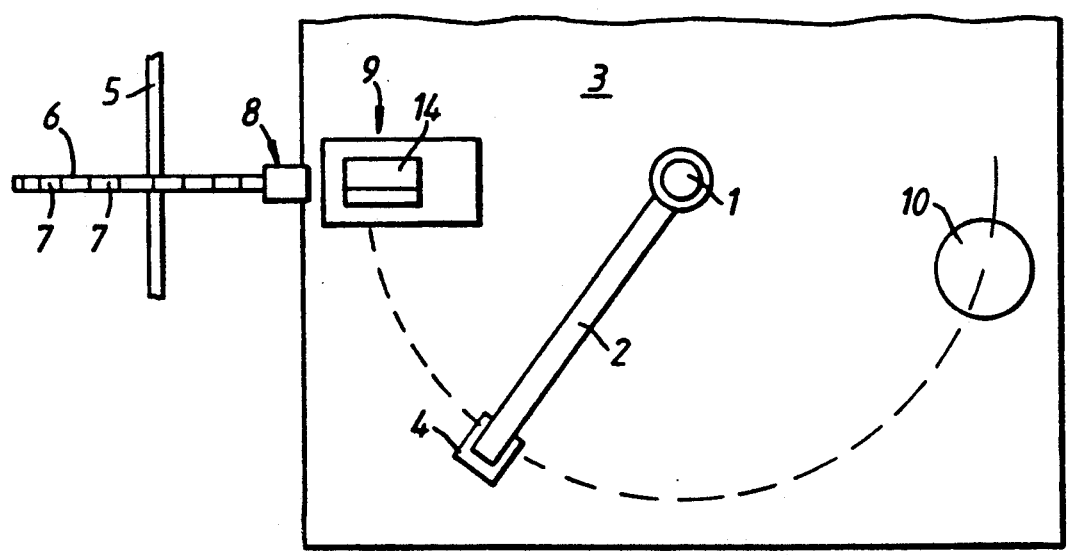
FIG. 2 is a very schematic plan view illustrating a second embodiment of apparatus involving the concepts of the invention.
Figure 3C:
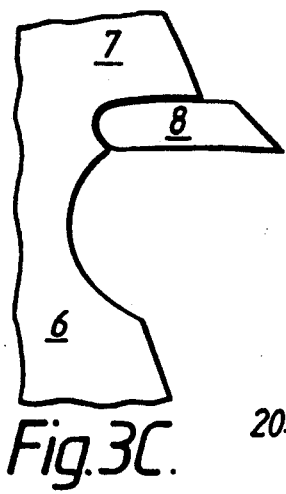
Figure 3B:
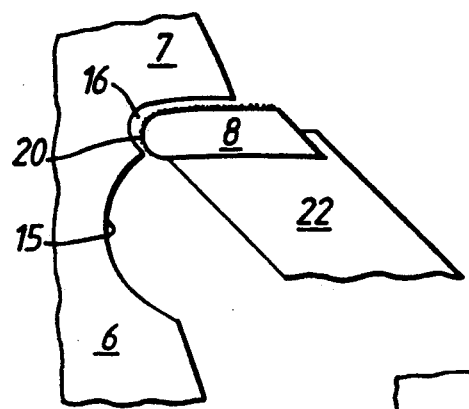
Figure 3A:
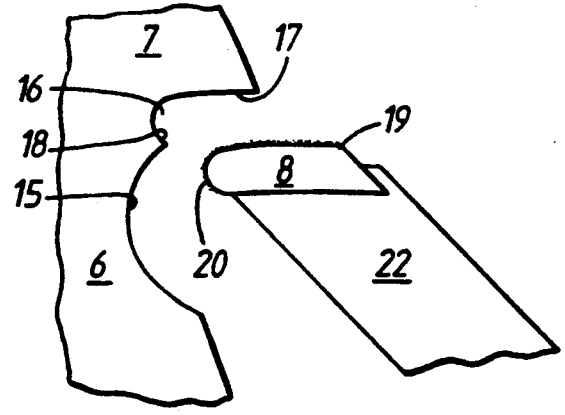
Figure 4:
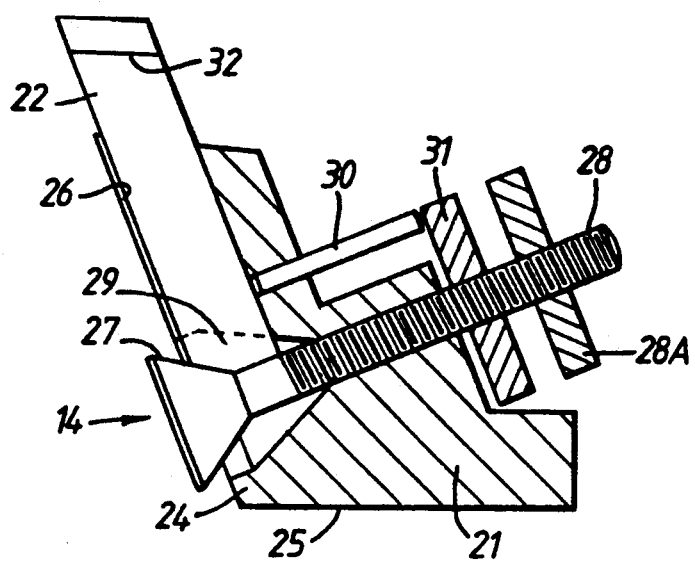
Figure 5:
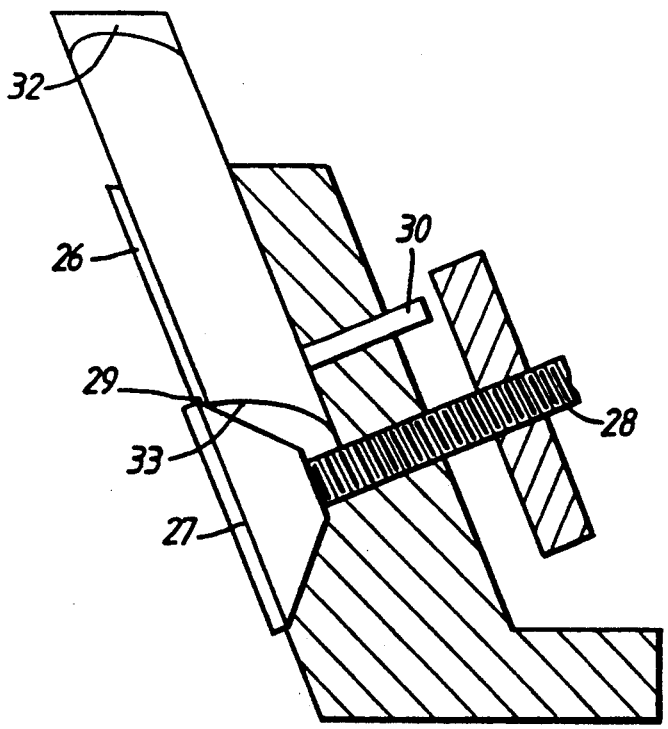
Figure 6:
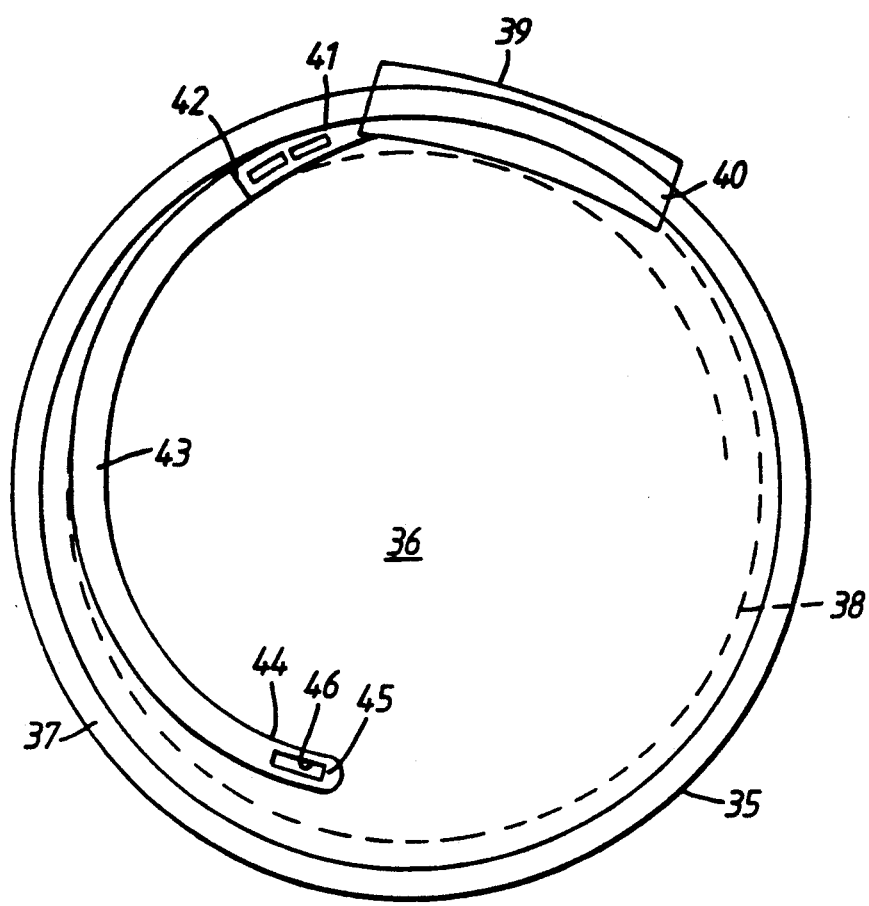

FIGS. 3A, 3B and 3C schematically illustrate stages in the presentation of a tip to the associated blade tooth;

FIG. 4 is an elevation of a detail of the apparatus of FIGS. 1 or 2;

FIG. 5 is a part sectional view of the detail of FIG. 3;

FIG. 6 schematically illustrates a part of the tip feeding arrangements of the apparatus.

Figure 7:
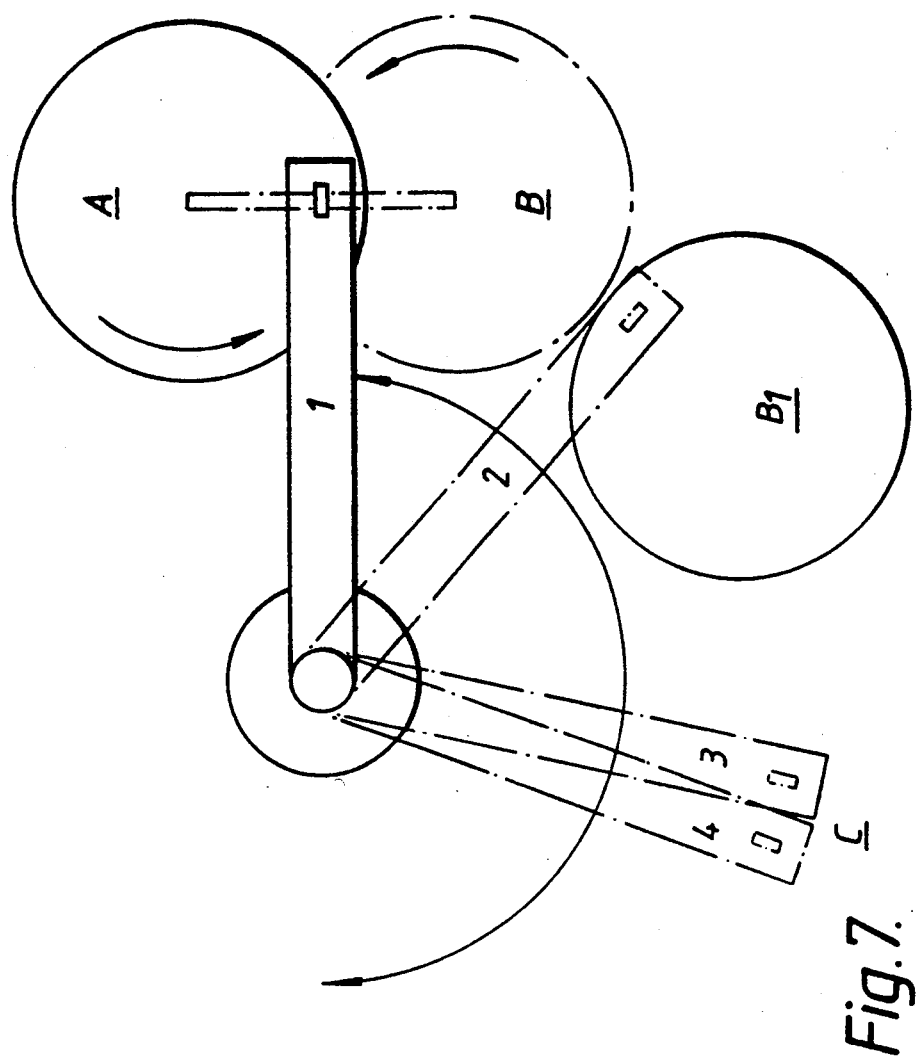

FIG. 7 is a very schematic view of a third embodiment of the apparatus involving the concepts of the invention.

Referring now to FIG. 1 the apparatus for mounting hard material tips to a saw blade includes a pillar 1 carrying an arm 2 for rotation about a vertical axis. The pillar 1 is upstanding from a support base or table 3 of the apparatus. The arm 2 carries a gripper or pick-up unit 4 which is lowerable to engage with a tip to be entrained thereby and liftable to a transportation level by means (not shown). Such means can comprise a pneumatic or hydraulic cylinder arrangement or a suitable profiled cam arrangement. The apparatus also includes a horizontally arranged support arbour 5 for carrying a saw blade 6 having teeth 7 that are to be provided with tips 8. The blade 6 is thus rotatable about a horizontal axis. The arbour 5 is selectively positionally adjustable so that the different diameter blades may be rotated on the arbour by an indexing finger (not shown) that engages with the teeth to index the teeth to present the next tooth to be tipped to a predetermined position with respect to a work station 9 i.e., brazing station. The indexing arrangements include means (not shown) for locking the blade against rotation when said next tooth is in the indexed position.

The various tip types and materials required for mounting the tips to the blade teeth are provided at a series of supply locations arranged on a circle having its centre at the axis of rotation of the arm 2. Thus, as can be seen from the FIG. 1 a supply of a first type of tip can be provided at location 10, and a supply of a second type of tip can be provided at a location 11, a supply of brazing flux can be provided at location 12, a supply of brazing material can be provided at location 13. In practice, the positional order of the various locations may be arranged as thought necessary.

The rotatable arm 2 is of such length that the gripper/pick-up unit 4 can be caused to co-operate with the item or the like at each of the locations 10 to 13 as required. In addition, the mounting of the gripper/pick-up device 4 is such that it is able to present the flux, brass or tip as the case may be to a tip transfer unit 14 located adjacent to the work station 9. The transfer unit 14 will be discussed in greater detail hereinafter.

In addition, the apparatus incorporates means for controlling the position of the unit 4 so that it is correctly operationally set during the rotational movements of the arm 2 with respect to the brazing station 9. That is to say the arm 2 will be rotated with respect to the brazing station 9 in accordance with apparatus operation cycle.

It will be understood that with the apparatus, as shown in the FIG. 1, the gripper arm 2 is required to rotate in one direction only so that the overall operation of the apparatus is greatly simplified in that it is only necessary to provide arrangements for stepwise rotating the arm 2 and for actuating the gripper/pick-up unit 4 at a said location as and when required.

The pick-up unit 4 can comprise a gripping device including tip engagement fingers which are operationally controllable between an open position, i.e., tip release position, and a closed position i.e., tip engaging and transport position. The operation of the unit 4 is sequenced with the position of the arm by said control means. A further form of pick-up device can comprise a vacuum type pick-up.

The pick-up device is arranged to deliver the tip to the tip transfer unit 14 which is intended to support and advance the tip to the actual position in which it is welded or brazed to the blade tooth.

It will be noted from FIG. 2 that in the case where the saw blades or tips are pre-provided with the brazing material and flux, the apparatus can be further simplified in that it is then only necessary to provide the supply locations for the required tip types. With this modification it will be appreciated that it is not necessary for the arm 2 to rotate through a complete circle since it is possible merely to swing the arm 2 between the supply location(s) and the transfer unit 14. This arrangement leads to further simplification and cost reductions.

The arm 2 and the operation of the gripper/pick-up device can be operated by any convenient means. For example, stepper motors, hydraulic or pneumatic actuator systems.

A further aspect of the present invention is concerned with the actual mounting of the tip to the saw blade. This aspect of the invention will be considered in relation to FIGS. 3, 4 and 5.

In general, there are many forms i.e., shapes and profiles presently utilised for the hard material tips for tipped saw blades. In each case, however, the same basic method of mounting the tip to the blade tooth is employed.

The formation of the teeth 7 on a blade is such as to provide a gullet 15 between each pair of adjacent teeth. In addition, each tooth that is to receive a tip is provided with a recess 16 for receiving the actual tip 8. These recesses 16 are formed on the leading face of the gullet 15 (with respect to the operational direction of rotation of the blade) in such manner as to present mounting surfaces 17 and 18 for the bottom and rear faces 19 and 20 of a tip (as considered with respect to the direction of operational rotation of tip when attached to the associated blade tooth). The surface 17 is in the form of a plane surface which is directed generally radially of the blade and the surface 18 is usually directed transverely of the first surface and frequently comprises a curved surface which merges into the inner end region of the surface 17. Depending upon a particular design or profile for the tip this surface 18 can be of a totally curved formation. The surfaces 19 and 20 of the tip 8 are secured to the surfaces 17 and 18 by a welding, brazing or like operation. In practice, the welding or brazing material and any fluxes that are required for the formation of the joint can be applied to the zone of welding or brazing by any one of a variety of ways. For example, during the operational cycle of the tip mounting apparatus or alternatively the weld or braze and flux materials may be applied as a precoating to the tip rear and bottom faces 19 and 20 or to the surfaces 17 and 18 of the blade tooth. A further possibility is that both the blade teeth and tips may be precoated.

Referring now to FIGS. 3A to 3C. These Figures schematically represent stages in the presentation by the transfer unit 14 of a tip 7 into the recess 16. The right hand FIG. 3A illustrates schematically the transfer unit 14. The unit 14 essentially provides a carrier 21 for supporting a heat resistant support member 22 so that it is inclined to the vertical at a predetermined direction, for example, at an angle of 45 degrees. The support member is so mounted in the carrier 21 that by adjusting control members (not shown in FIGS. 3A to 3B) the initial position of the support member may be positionally adjusted relative to the plane of the surface of the worktable or surface 3 and locked in the adjusted position. Arrangements (not shown), for example, hydraulic or pneumatic rams or cam arrangements, are provided for simultaneously advancing the support member in the said direction. The effect of this movement, which can be considered as being composed of a simultaneous movement in the vertical direction and movement in a horizontal direction, is to position simultaneously the tip surfaces 19 and 20 against the recess surfaces 18 and 19. The control arrangements are such as to maintain pressure upon the tip to push it firmly into the requisite nested position. As a result of this continued pressure the tip, upon heating the tip and tooth to melt the braze the molten braze material is not wiped away from between either or both of the co-operating pairs of surfaces. The FIG. 3B illustrates the relationship between the tip and recess just before contact there between. FIG. 3C illustrates the tip after having been secured to the tip. As will be seen there is a uniform distribution of braze material between the pairs of co-operating surfaces 17,19 and 18,20.

The transfer unit 14 is shown in greater detail in FIGS. 4 and 5. The carrier unit 21 includes a body 24 having a base surface 25 for resting upon the machine worktable 3 or other horizontal reference provided with a guide channel 26 for the support member 22. The member 22 can be positionally set within the channel by means of a ramp surface 27 provided on a positionally adjustable operating screw or the like 28 engaging with the lower end surface 29 of the support member the screw having an operating head 28A associated therewith. A locking pin 30 is mounted in the body in such manner that that a knurled nut 31 provided upon the operating screw 28 can serve to lock with the pin 30 to lock the support in the position into which it has been moved by the ramp surface 27. The formation of the support member 21 is shown in greater detail in FIG. 5. As will be noted both the upper end 32 and the lower end 33 can be profiled to accept a particular form of tip 8. As shown, the upper end 32 of the support is shaped so as to be able to support a tip of the kind known under the Trade Name Pirana. The lower end 33 is shaped so as to be able to support, on reversing the support 22 within the channel, an alternative form of tip.

A further aspect of the invention provides a unit for feeding the tips to be mounted to a said supply location at which the tip can be entrained by the gripper/pick-up unit 4.

According to the invention there is provided a method of preventing over-feed of a number of descrete elements along an element feed path of a vibratory bowl feeder, wherein after a predetermined number of the elements have entered a predetermined zone or region of the feed path the last element to be allowed on the feed path zone or region is caused to act as a deflector for displacing any following elements away from the feed path back into the bowl.

In accordance with a further aspect of the invention there is provided a vibratory bowl type feeder assembly, wherein elements after having been fed to a sorting zone or the like are enabled to enter an element guide for guiding the elements to an element pick-up location, wherein the guide and pick-up location are located totally within the circumference of the wall of the bowl of the feeder.

Preferably, the pick-up location is located at a radial distance from the centre of the bowl that is less than any other part of the element guide path.

Referring now to FIG. 6 this Figure schematically illustrates the principles of operation of a vibratory bowl feeder 35 incorporating the concepts of the invention. As is common to vibratory bowl feeders the feeder 35 includes a bowl 36 for receiving the elements (the tips 8) to be fed from a bulk supply thereof. The wall 37 of the bowl 36 has formed therein an upwardly directed circumferential spiral element feed path 38 leading to a tip sorting/segregation zone 39. This zone 39 is only very schematically shown. In practice, the particular form of the zone 39 will depend upon the shape and profile of the tips 8 introduced into the bowl. The principle function of the zone 39 is to sort the tips being fed so that they are all oriented in a predetermined required manner which is related to the mounting of the tips to the blade teeth. In general, such feeder arrangements as so far considered are well known and conventionally rely upon vibrational forces developed by vbrating the bowl 36 to cause the tips 8 to shuffle lengthwise along the ramp-like feed path (schematically represented by dashed lines 38) and which spirals progressively upwards of the bowel wall to the tip zone 39. The arrangements at the tip sorting/segregation zone 39 includes a feed inlet 40 for the tips, means (not shown) for engaging with a selected feature of a tip so that whenever a tip is oriented during its climb up the ramp such that said selected feature is in a particular predetermined orientation relative to the engaging means as to be engaged thereby this tip is allowed to move into a tip sorted section 41 of the tip feed path, whereas if the orientation of the tip is such that the selected feature of the tip is not in said orientation the tip is prevented from advancing further along the feed path and as a result automatically falls back into the bowl to be made available for a further climb up the ramp-like feed path.

The tip sorted section 41 of the feed path connects with the inlet end 42 of a tip feed guide 43 which is so shaped and dimensioned relative to the tips 8 to be fed therethrough that once a tip 8 has entered the guide 43 it is only able to move along the guide 43 without any possibility of the tip twisting or other wise changing its orientation to the the orientation thereof at the time of entry into the guide 43. The outlet end 44 of the guide terminates in a tip pick-up zone 45. This zone 45 can comprise an opening in the guide 43 of such dimensions and form that a sufficient portion of a single tip 8 is positioned as to be engageable by the gripper/pick-up unit 4. The guide 43 may be formed from a tubular member which totally encloses the tips during their passage therethrough. If desired, a narrow slit (not shown) may extend lengthwise of the tube to facilitate elimination of any jambing of the guide 43 by a tip or tips 8. When the guide 43 is tubular the outlet end 44 can comprise a slot 46 of effectively one tip length in length and which allows the tip to be lifted from he tube opening by the gripper unit 4. As will be seen from the drawing the outlet end 44 of the guide 43 is located inside the bowl 36. This forms a feature of the invention. With this arrangement in the event that any tips spill from the outlet and any such tips will fall directly back into the bowl.

It will be noted that the pick-up location 45/46 is located at a radial distance from the centre of the bowl that is less than any other part of the element guide 43. This has the advantage that the amplitude of vibration at this location is less that that prevailing at the bowl wall 37 whereby the tips are vibrating less during pick-up thereby reducing the possiblity of the gripper device 4 not entraining a tip when required to do so.

In addition, as a further feature of the invention the length of the tip support path between the guide i.e., tube inlet end 42 and the end 41 of the preceding tip selection or rejection zone 39 is arranged to be equal to a predetermined number of tip lengths. The arrangement is such that in the event that the free flow of tips through the guide 43 is prevented said predetermined number of tips is able to build up to form a continuation of the chain of end-to-end tips in the guide 43 so that the outermost end of the last tip in the overall chain acts as a buffer against which any additional tips being selected impacts thereby automatically causing any such additional tips to be deflected away from the feed direction to the guide 43 to a position in which they automatically fall into the bowl 36.

A further feature is that means are provided for detecting the presence of a tip at a particular position with respect to the inlet to the guide 43 and producing from each such detection a control signal which is utilised to operate means for preventing further tips from entering the segregation zone 39. Such means can be a deflector pin or other element (not shown).

It will be understood that if the guide 43 is in the form of a closed tube or a tube with a narrow slot it is possible to introduce a progressive twisting of the guide tube so as to invert the tips passing therethrough. This can be of importance when the sorting arrangement is able to deal with the tips in orentation which differs from that required for the mounting.

At this point it is convenient to note that whilst the forgoing has been specifically dirrected to the tipping of saw blades the concepts and apparatus of the invention can be applied to the tip of other forms of tool having a plurality of hardened tips which are subsequently machined to provide the cutting edges to the tool.

In a modification of a detail of the apparatus of the present invention it is proposed to make use of the movement of the element 22 that advances the tip into its desired position to place flux or or brazing paste into the seating for the tip. This proposal has the advantage of elininating a separate operation for the application of flux/brazing paste or the like. In a further variation the blade indesing arrangements can be adapted also to introduce the flux/braze.

In a further modification the arrangments provided for advancing the tip to its required position on the blade or tool tooth an air cylinder (not shown) can be used to maintain the requisite pressure upon the tip during the melting of the braze and, in addition, the arrangements can be such that prior to the tip nesting into the seating on the tooth the flux/braze is injected into the required position. This arrangement has the advantage that the risk of the advancing movement of the tip wiping melted braze or the like from being interposed between the base and rear of a tip has been found to be reduced.

With the modifications the sequence of tipping events can be briefly mentioned as follows. Firstly the saw blade is indexed to bring the next tooth to br tipped into the required position and the same time flux/braze paste is applied to the tip receiving recess. The tip providng arm them brings the tip into cooperation with the tooth.

If necessary, additional flux/braze can be gathered onto the tip as has been discussed. In situations where metal brazing strip is required to be used the strip will be placed in position so as to be interposed between tip and tooth.

The nesting pressure is maintained on the tip whereby on application of heat the flux/braze/metal strip melts and spreads whereby the pressure being exerted upon the tip forces the tip firmly into the recess provided therefore and is held in such position until sufficient cooling takes place.

The tips can take various forms and be of various sizes for example in addition to that previously mentioned the tip can be seven millimetres in length, four millimetres wide and three millimetres deep. It will be understood that such dimensions given are not intended to be limiting.

The arrangements of FIGS. 4 and 5 illustrate the supporting of two distinct forms of tip. The tip of FIG. 4 is a generally rectangular or trapizoidal type of tip which is very commonly used.

FIG. 5 illustrates the handling of a particular form of tip known under the Trade Name 'Pirana', this name being the property of The Black and Decker Company. In the orientation shown in the FIG. 5, the lower face of this particular tip form tip has a curved profile and the upper face planar. This combination provides when the tip is mounted to a blade a hook like formation to the top and front face combination of the tip when fitted to a blade.

The forgoing description has been mainly concerned with apparatus in which the gripper/pick-up member/element its during operation is rotated through three hundred and sixty degrees of arc.

FIG. 7 very schematically illustrates an embodiment in which the gripper/pick-up member/element is required to oscillate through a part circular path for example, one hundred and eighty degrees of arc. The apparatus of FIG. 7 includes locations similar to those previously discussed and the various locations have been identified in a manner similar to those of the previous Figures. That is to say the apparatus incorporates a gripper/pick-up arm 2 which is mounted for rotation between tip supply locations A and B at which the tip to be mounted is gathered and correctly positioned for picking-up by the arm 2. The Figure schematically illustrates two possibilities to cover a blade tipping requirement of tips 8 having alternate top face bevels. Thus the FIG. 7 illustrates a second i.e., alternative tip bevel pick-up location B1. After gathering the arm 2 moves the gathered tip to a location at which brazing flux is applied to the tip and then through a silver solder application station at which the tip rear and bottom faces are silver soldered. Following this the arm 2 is advanced to the actual tip mounting location. That is to say the tip presented to the saw blade 6 to be tipped. As indicated arrangements C are provided for automatically loading the blades to be tipped to the blade tipping location and for fluxing the teeth of the blade. Since the individual tipping operation stages have been discussed in relation to the previous Figures a detailed description of FIG. 7 is not thought to be necessary.

I claim:

1. A method of mounting a hard material cutting edge tip forming element to a cutter tool, comprising the steps of
    positioning a plurality of tip forming elements at a defined location along a circular track set at a predetermined radius about a pillar,
    circularly moving an arm attached to the pillar, the arm being connected to a gripper/pick-up member configured for handling at least one of the plurality of tip forming elements,
    transferring with the gripper/pick-up member said at least one of the tip forming elements from its first position to engagement with a tip transfer unit positioned adjacent to the cutter tool, and
    mounting said at least one of the tip forming elements to the cutter tool.

2. The method of claim 1, wherein the gripper/pick-up member is rotatable exclusively in one direction to transfer the tip forming elements to the tip transfer unit.

3. The method of claim 1, wherein the step of mounting the tip forming element further comprises mounting the tip forming element to a saw blade.

4. The method of claim 3, further comprising the step of advancing the tip forming element towards a tooth of a cutter tool for securement thereto without any relative sliding displacement between the tip forming element and tooth while weld material is in a molten condition.

5. The method of claim 1, further comprising the step of positioning a vibratory bowl feeder to transfer a plurality of tip forming elements to said defined location along the circular track.

* * * * *